United States Patent [19]

Tada et al.

[11] Patent Number: 5,198,315
[45] Date of Patent: Mar. 30, 1993

[54] ZINC ALKALINE CELLS

[75] Inventors: Kinya Tada; Masaaki Kurimura; Mutsumi Yano, all of Osaka; Eiichiro Mieno, Gunma; Wataru Sekiguchi, Gunma; Junzo Nakagawa, Gunma; Takanori Akazawa, Gunma, all of Japan

[73] Assignees: Sanyo-Ekuseru Kabushikigaisha; Toho-Aen Kabushikigaisha; Sanyo-Denki Kabushikigaisha, all of Japan

[21] Appl. No.: 748,008

[22] Filed: Aug. 21, 1991

[30] Foreign Application Priority Data

Mar. 12, 1991 [JP] Japan ................................ 3-72336

[51] Int. Cl.$^5$ .............................................. H01M 4/42
[52] U.S. Cl. ...................................... 429/209; 429/229
[58] Field of Search ................................ 429/209, 229

[56] References Cited

U.S. PATENT DOCUMENTS 4,735,876  4/1988  Miura et al.
4,743,185  5/1988  Vu et al. ......................... 429/229 X
4,861,688  8/1989  Miura et al. ..................... 429/229 X

FOREIGN PATENT DOCUMENTS 2634594   1/1990  France .
59-30550  2/1984  Japan .
59-30561  2/1984  Japan .
59-197197 9/1984  Japan .
59-197198 9/1984  Japan .

Primary Examiner—Stephen Kalafut
Attorney, Agent, or Firm—Townsend, Snider & Banta

[57] ABSTRACT

A zinc alkaline cell is formed by using an anode active material which contains a non-amalgamated zinc alloy powder having a bulk specific gravity ranging from approximately 2.90 to 3.50 (grams per cm$^3$) and containing a predetermined amount of indium coated on a surface of the non-amalgamated zinc alloy powder containing a predetermined amount of lead or a predetermined amount of a mixture of lead with bismuth or aluminum as a zinc alloy powder component, other than unavoidable impurities. The zinc alkaline cell can achieve corrosive resistance and discharge performance as a cell and it is comparable with cells formed by using amalgamated zinc alloy powder which has been practically employed.

5 Claims, 4 Drawing Sheets

ZINC ALKALINE CELLS

BACKGROUND OF THE INVENTION

1. Field of the Invention

The present invention relates to a zinc alkaline cell using zinc alloy powder as an anode active substance, an alkaline electrolytic solution as an electrolytic solution, and manganese dioxide, silver oxide, oxygen, nickel hydroxide, etc. as a cathode active substance and, more particularly, to a zinc alkaline cell in which improved zinc alloy powder is employed as the anode active substance.

2. Description of Related Art

Heretofore, conventional zinc alkaline cells have the problem in common that the zinc anode is corroded by an electrolytic solution during storage. In order to solve the problem as industrial means, hydrogen overvoltage is elevated by using amalgamated zinc powder containing approximately 5% to 10% by weight of mercury, thereby suppressing corrosion to such an extent as causing no practical problem.

Recently, however, as social demand of cells containing less or no mercury has been increased, various research has been made in order to combat with pollution. For instance, as disclosed in Japanese Patent Publication (kokoku) No. 42,114/1989, there has been employed amalgamated zinc alloy powder containing approximately 0.6% by weight of mercury, which is prepared by amalgamating zinc alloy containing lead or aluminum with an indium-mercury alloy.

It is to be noted that, even if mercury has been reduced to the amount as low as approximately 0.6% by weight, mercury is still contained and the problem with environmental pollution cannot be said to be solved. Also, the amalgamated zinc alloy powder as proposed in Japanese Patent Publication (kokoku) No. 42,114/1989 is expected to reduce its mercury rate to a lesser content, however, the problems may still exist that the anode zinc may cause corrosion and that discharge performance as a cell may be impaired, even if zinc alloy powder for such a cell would not be amalgamated. Hence, the problem with environmental pollution by mercury still persists. Further, from the resource point of view, too, it is desired to reproduce zinc and so on from used dry cells, however, the mercury contained in the cells, whatever the amount of mercury is, causes the problem in the step of reproducing the zinc and so on.

SUMMARY OF THE INVENTION

Therefore, the present invention has the object to provide a zinc alkaline cell which does not reduce its resistance to corrosion and deteriorate its discharge performance as a cell even when zinc alloy powder to be employed as the anode substance is not amalgamated.

As a result of extensive research, it has been found that a zinc alkaline cell can be provided which causes no problems with resistance to corrosion and discharge performance as a cell even if the cell would not be amalgamated by using zinc alloy powder as an anode active substance, zinc alloy powder being prepared by coating its surfaces with indium and adjusting its bulk specific gravity.

Other objects, features and advantages of the present invention will become apparent during the course of the description of the preferred embodiments, which follow, with reference to the accompanying drawings.

DESCRIPTION OF THE PREFERRED EMBODIMENTS

Figure 1:
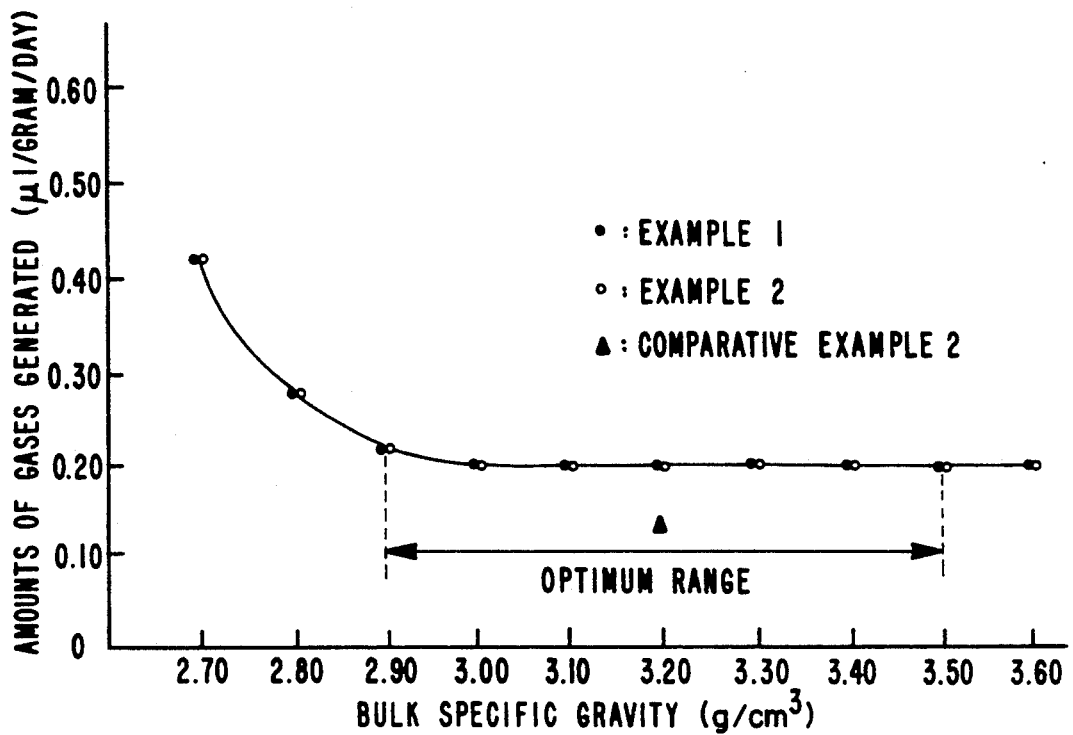
FIG. 1 is a graph showing the relationship between the bulk specific gravity of zinc alloy powder and the amounts of gases generated.

In accordance with the process of the present invention, the zinc alkaline cell uses non-amalgamated zinc alloy powder as an anode active substance, whose surface is coated with indium and whose bulk specific gravity is adjusted to a range from 2.90 to 3.50 (grams per $cm^3$). Although the details of the action of indium to be coated on the surface of the zinc alloy powder are not yet clarified, it is assumed that the addition of indium has two functions: the first function being of elevating the hydrogen overvoltage on the surface of the zinc alloy powder, thereby demonstrating the action of suppressing gases from generating due to corrosion of a cell during storage, and the second function being of keeping contact of zinc alloy powder particles with each other, thereby exhibiting the action of maintaining good discharge performance.

If the bulk specific gravity of the zinc alloy powder would be less than 2.90 (grams per $cm^3$), on the one hand, the action of suppressing gases from generating may be reduced because the shapes of the zinc alloy powder particles may become so nearly acicular that the specific surface area of the zinc alloy powder particles becomes large enough to make their reactivity too high. If the bulk specific gravity thereof would be larger than 3.50 (grams per $cm^3$), on the other hand, the discharge performance may be lowered because the shapes of the zinc alloy powder particles become so nearly spherical that their surface area becomes smaller, thereby making their reactivity too low.

The amount of indium to be added to or coated on the zinc alloy powder may preferably range from 0.05% by weight to 0.80% by weight. When the zinc alloy powder contains the indium in the amount within the foregoing range, the generation of gases due to corrosion resulting from the action of elevating the hydrogen overvoltage on the surface of the zinc alloy powder during storage as a cell can be suppressed. On the other hand, if the amount of the indium to be added to or coated on the zinc alloy powder would be outside the aforesaid range, the capability of suppressing gases from generating is reduced.

The zinc alloy powder contains a predetermined amounts of lead, a predetermined amounts of lead and bismuth or a predetermined amounts of lead and aluminum. The amount of the lead may range from approximately 0.01% by weight to 0.10% by weight. The amount of the bismuth may range from approximately 0.005% by weight to 0.05% by weight and the amount of the aluminum may range from 0.01% by weight to 0.05% by weight. The lead and bismuth can demonstrate the ability of suppressing gases from generating when they are contained at the rates as illustrated hereinabove, while they exhibit the lessened effect of suppressing the generation of gases if they are contained at the rates outside the aforesaid ranges. On the other hand, the aluminum can demonstrate the ability of making the surface of the zinc alloy powder smooth by allowing them to be alloyed with zinc, thereby reducing the specific surface area involving reactivity of the zinc alloy powder and as a result achieving the effect of suppressing the generation of gases. If the amounts of the aluminum would be outside the ranges, no such expected effect can be achieved.

The present invention will be described more in detail by way of examples with reference to the accompanying drawings.

Preparation of Zinc Alloy Powder:

Zinc metal having the purity of 99.995% by weight or higher was molten at approximately 500° C. and the predetermined amount of lead, the predetermined amount of lead with bismuth or the predetermined amount of lead with aluminum were or was added to the molten zinc metal, thereby yielding molten zinc alloys which in turn were pulverized by spraying and thereafter screened into zinc alloy powder having a predetermined particle size range.

Preparation Example A

A mixer with a heater was charged with a predetermined amount of the zinc alloy powder having the predetermined particle size range and a predetermined amount of the indium particles and replenished with nitrogen gas, followed by mixing the mixture at 180° C. for 1 hour. This operation allowed the indium having the melting point of 156.4° C. to adhere to the surface of the zinc alloy powder, thereby yielding zinc alloy powder having a predetermined bulk specific gravity. The bulk specific gravity of the zinc alloy powder has been measured by test procedures in accordance with JIS Z2504.

Preparation Example B

A predetermined amount of the zinc alloy powder having the predetermined particle size range was poured into a solution of a predetermined amount of an indium salt such as indium sulfate or the like in water and the resulting mixture was stirred for 30 minutes, thereby coating the surface of the zinc alloy powder with indium by ion substitution method. The resulting zinc alloy powder was washed with purified water (ion exchange water), followed by replacing water adhering on the zinc alloy powder by acetone and drying it at 45° C. for one day. The resulting zinc alloy powder was found to have the bulk specific gravity within the range as specified hereinabove.

EXAMPLE 1

Figure 7:
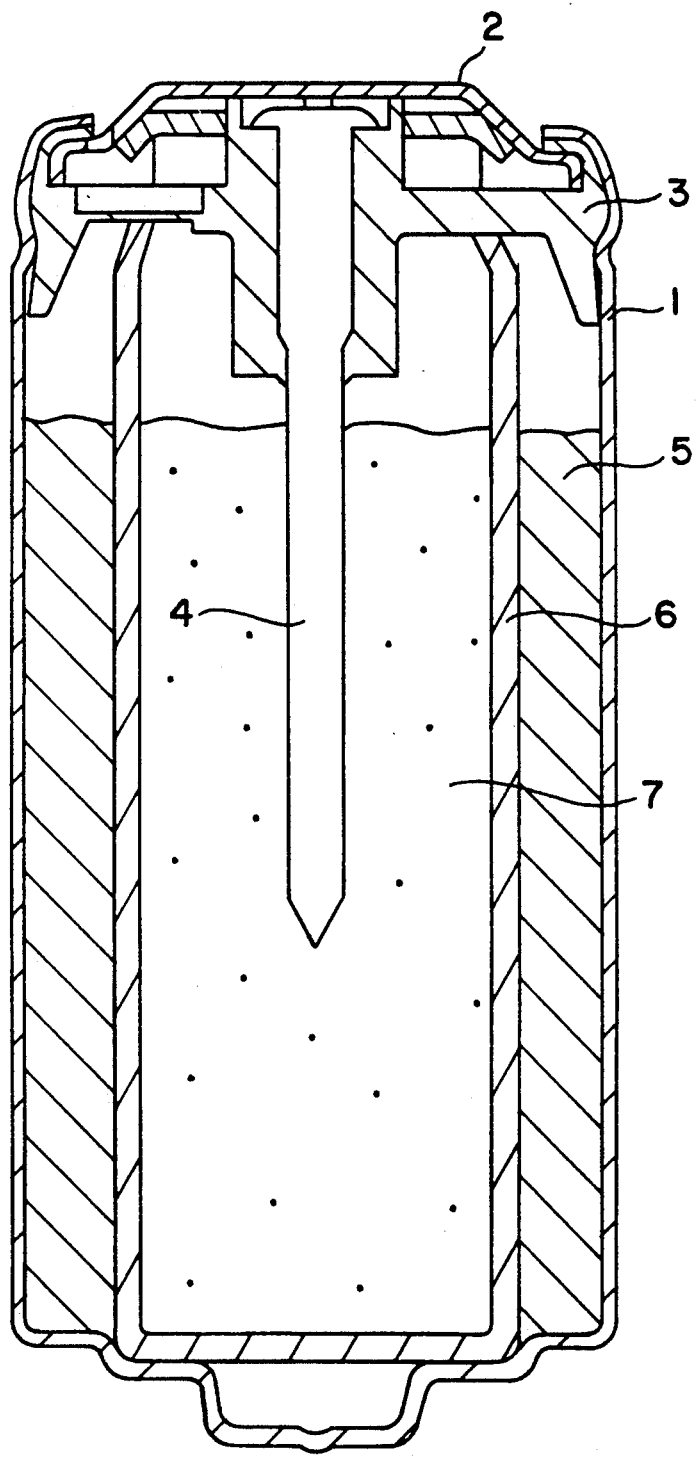
FIG. 7 is a sectional view showing a cell of LR6 type.

A LR6 type cell as shown in FIG. 7 was formed by using the zinc alloy powder prepared in Preparation Example A so as to have the bulk specific gravity of 3.2 (grams per $cm^3$), whose surface has been coated with indium at the rate of 0.10% by weight.

Referring to FIG. 7, the LR6 type cell is shown to comprise a cathode can 1, an anode terminal 2, a sealant 3, an anode collector 4, a cathode active material 5 formed by pressing a mixture of black lead with manganese dioxide under pressure, a separator 6, and an anode 7 prepared by gelling an electrolytic solution with polyacrylic acid and others, a solution being prepared by saturating zinc oxide with a 40% by weight aqueous solution of KOH and then dispersing zinc alloy powder or pure zinc powder in the resulting gel.

EXAMPLE 2

A LR6 type cell was formed in the same manner as in Example 1 by using the zinc alloy powder prepared in Preparation Example B so as to have the bulk specific gravity of 3.2 (grams per $cm^3$), whose surface has been coated with indium at the rate of 0.10% by weight.

COMPARATIVE EXAMPLE 1

A LR6 type cell as shown in FIG. 7 was formed by using an alloy prepared by uniformly alloying pure zinc powder having the purity of 99.995% by weight or higher containing neither lead nor bismuth nor aluminum and having the bulk specific gravity of 3.2 (grams per $cm^3$) with indium in such a manner that the indium is contained at the rate of 0.10% by weight.

COMPARATIVE EXAMPLE 2

A LR6 type cell was formed in the same manner as in Example 1 by using zinc alloy powder amalgamated by indium-mercury alloy in conventional manner. The amalgamated zinc alloy powder was found to contain 0.02% by weight of indium, 0.05% by weight of lead, 0.05% by weight of aluminum, and 0.6% by weight of mercury and have the bulk specific gravity of 3.2 (grams per $cm^3$).

COMPARATIVE EXAMPLE 3

In the same manner as in Example 1, a LR6 type cell was formed by using pure zinc powder having the bulk specific gravity of 3.2 (grams per $cm^3$).

All the LR6 type cells prepared hereinabove were tested for their discharge performance at 3.9 ohms and at the end voltage of 0.9 volt. The test results are shown in Table 1 below.

TABLE 1

|  | Discharge Duration Time (hours) |
| --- | --- |
| Example 1 | 5.22 |
| Example 2 | 5.22 |
| Comparative Example 1 | 3.80 |
| Comparative Example 2 | 5.25 |
| Comparative Example 3 | 2.80 |

As is apparent from Table 1 above, it has been found that the cells prepared in Example Nos. 1 and 2 had substantially the same discharge performance as conventional cells prepared by using the zinc alloy powder amalgamated with indium-mercury alloy. Further, it has been found that there is no difference in discharge performance between the processes for preparing the zinc alloy powder. Furthermore, the cells prepared by using the pure zinc alloy powder (as in Comparative Example 1) and the pure zinc powder (as in Comparative Example 3) were poorer in discharge performance than the others.

EXAMPLE 3

Cells of a LR6 type were prepared in the same manner as in Example 1 by using the zinc alloy powder containing lead at the rate of 0.01% by weight and indium at the rate of 0.05% by weight and having varying degrees of bulk specific gravity. The resulting cells were then tested for their discharge performance after storage for one month at 60° C. The discharge performance was measured at 3.9 ohms and at the end voltage of 0.9 volt. The test results are shown in FIG. 2. Further, they were tested for generation of gases by immersing 10 grams of the zinc alloy powder used for the test cells in 5 ml of a 40% by weight KOH aqueous solution at 60° C. for 30 days. The test results are shown in FIG. 1.

For comparative purpose, the cell prepared in Comparative Example 2 was likewise tested. The test results were shown by black triangle in FIG. 1 and FIG. 2. The amount of gases generated was found to be $0.12\mu$ l per gram per day and discharge duration was 5.25 hours.

Figure 2:
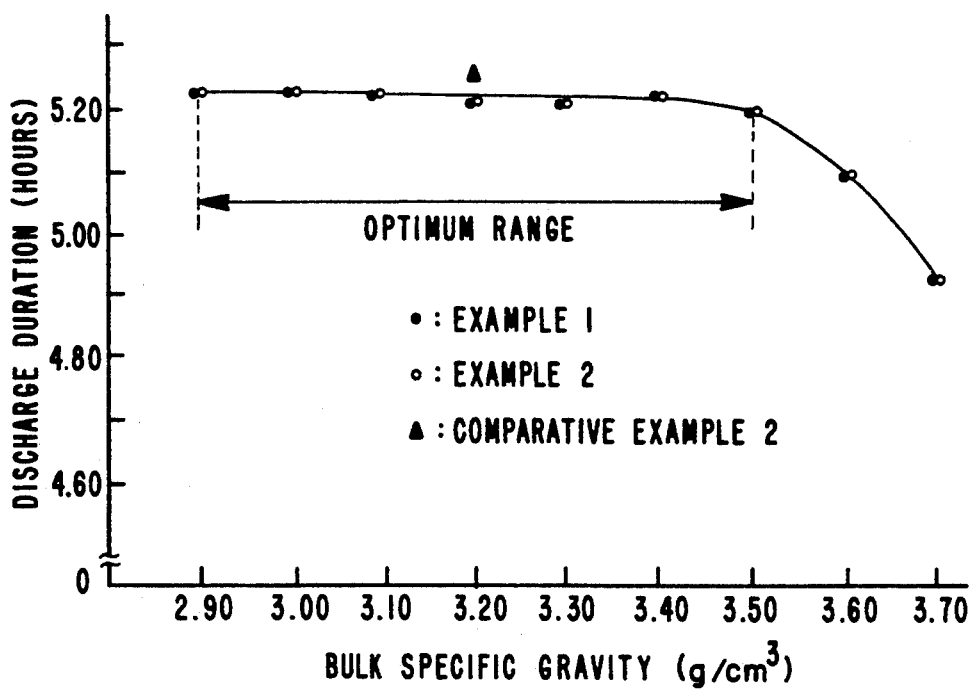
FIG. 2 is a graph showing the relationship between the bulk specific gravity of zinc alloy powder and discharge duration.

As is apparent from FIG. 1, it is found that the ability of suppressing the generation of gases is particularly good when the bulk specific gravity of the zinc alloy powder used is approximately 2.90 or more.

Further, as is apparent from FIG. 2, it is found that the discharge performance is particularly good at the bulk specific gravity of approximately 3.50 or lower. Hence, it can be determined from FIGS. 1 and 2 that the bulk specific gravity of the zinc alloy powder to be used range from approximately 2.90 grams per $cm^3$ to approximately 3.50 grams per $cm^3$ and that the cells prepared by the zinc alloy powder having the bulk specific gravity within this range can achieve the discharge performance comparable with conventional cells prepared by using amalgamated zinc alloy powder. Further, no difference in their properties is shown between the cells prepared in Examples 1 and 2. Although the cells according to the present invention exhibit the effect of suppressing the generation of gases to an extent somewhat lesser than the conventional cells, they are sufficiently applicable to practical use.

EXAMPLE 4

Zinc alloy powder containing 0.05% by weight of lead was prepared in the same manner as in Preparation Example A so as to contain 0.1% by weight of indium and have the bulk specific gravity of 3.2 (grams per $cm^3$). The zinc alloy powder was tested for the ability of generating gases in the same manner as described hereinabove. The test result is shown in Table 2 below.

A LR6 type cell was formed by using the zinc alloy powder prepared hereinabove in the same manner as in Example 1. It is found that the cell can achieve substantially the same discharge performance as the conventional ones.

EXAMPLE 5

Zinc alloy powder containing 0.025% by weight of lead and 0.05% by weight of bismuth was prepared in the same manner as in Preparation Example A so as to contain 0.1% by weight of indium and have the bulk specific gravity of 3.2 (grams per $cm^3$). The zinc alloy powder was tested for the ability of generating gases in the same manner as described hereinabove. The test result is shown in Table 2 below.

A LR6 type cell was formed by using the zinc alloy powder prepared hereinabove in the same manner as in Example 1. It is found that the resulting cell can achieve substantially the same discharge performance as the conventional ones.

EXAMPLE 6

Zinc alloy powder containing 0.025% by weight of lead and 0.05% by weight of aluminum was prepared in the same manner as in Preparation Example A so as to contain 0.1% by weight of indium and have the bulk specific gravity of 3.2 (grams per $cm^3$). The zinc alloy powder was tested for the ability of generating gases in the same manner as described hereinabove. The test result is shown in Table 2 below.

A LR6 type cell was formed by using the zinc alloy powder prepared hereinabove in the same manner as in Example 1. It is found that the resulting cell can achieve substantially the same discharge performance as the conventional ones.

COMPARATIVE EXAMPLE 4

Zinc powder was prepared by coating particle surfaces of pure zinc powder particles with indium so as for indium to account for 0.1% by weight. The resulting zinc powder was tested for the ability of generating gases in the same manner as described hereinabove. The test result is shown in Table 2 below.

For further comparative purpose, the amalgamated zinc alloy powder conventionally employed was tested for the ability of generating gases in the same manner as described hereinabove. The test result is shown in Table 2 below.

TABLE 2

| Samples | Amount of Gases ($\mu$l/gram/day) |
| --- | --- |
| Comparative Example 4 (Zn—In(0.1 wt %)) | 0.30 |
| Example 4 (Zn—In(0.1 wt %)—Pb(0.05 wt %)) | 0.15 |
| Example 5 (Zn—In(0.1 wt %)—Pb(0.025 wt %)—Bi(0.05 wt %)) | 0.10 |
| Example 6 (Zn—In(0.1 wt %)—Pb(0.025 wt %)—Al(0.05 wt %)) | 0.10 |
| Comparative Example 2 (Amalgamated zinc) | 0.12 |

As is apparent from Table 2 above, it is found that the zinc alloy powder used for the cells of Examples 4, 5 and 6 generated gases in the amounts lower than the indium-coated zinc powder used for the cell of Comparative Example 4 and the former is comparable with the amalgamated zinc alloy powder which has been practically employed.

EXAMPLE 7

Figure 3:
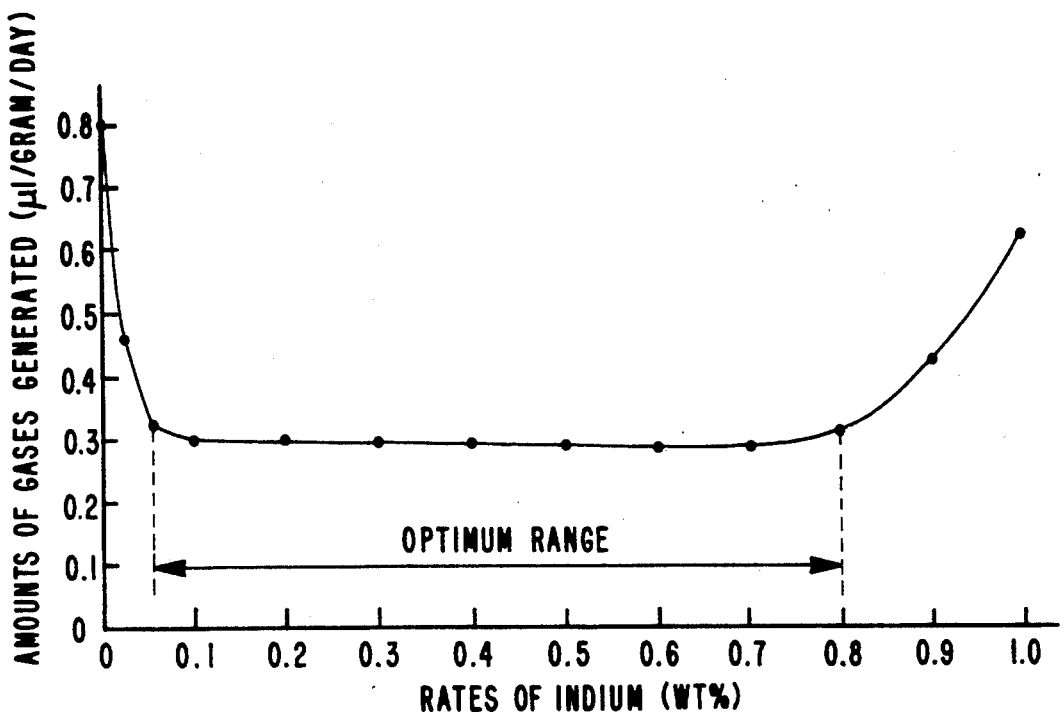
FIG. 3 is a graph showing the relationship between the rates of indium coated and the amounts of gases generated.

Zinc alloy powder having the bulk specific gravity of 3.2 (grams per $cm^3$) was prepared in the same manner as described hereinabove by coating pure zinc powder with varying amounts of indium, thereby yielding zinc alloy powder containing indium at varying rates. The zinc alloy powder was tested for the ability of generating gases in the same manner as described hereinabove. The test results are shown in FIG. 3.

A LR6 type cell was formed in the same manner as described hereinabove by using the zinc alloy powder prepared hereinabove so as to contain indium within the preferred range and found that it has achieved substantially the same discharge performance as conventional ones.

EXAMPLE 8

Figure 4:
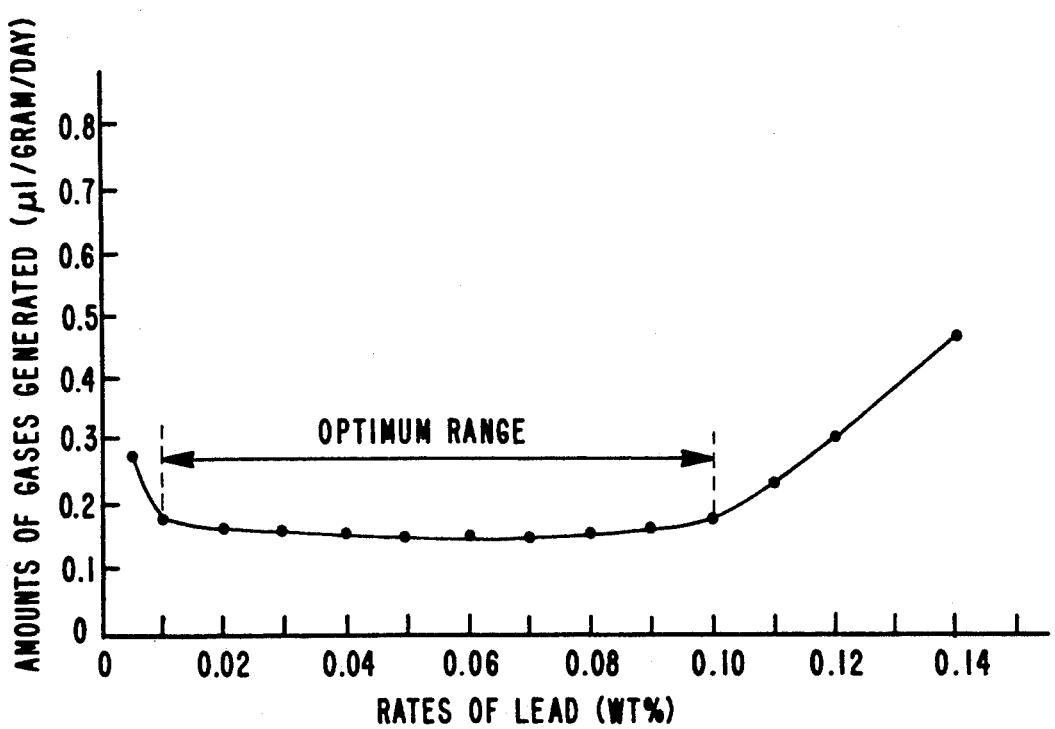
FIG. 4 is a graph showing the relationship between the rates of lead contained and the amounts of gases generated.

Zinc alloy powder having the bulk specific gravity of 3.2 (grams per cm$^3$) was prepared by using varying amounts of lead in the same manner as described hereinabove so as to contain 0.1% by weight of indium. The resulting zinc alloy powder was tested for the ability of generating gases in the same manner as described hereinabove. The test results are shown in FIG. 4.

A LR6 type cell was formed in the same manner as described hereinabove by using the zinc alloy powder prepared hereinabove so as to contain lead within the preferred range and found that it has achieved substantially the same discharge performance as conventional ones.

EXAMPLE 9

Figure 5:
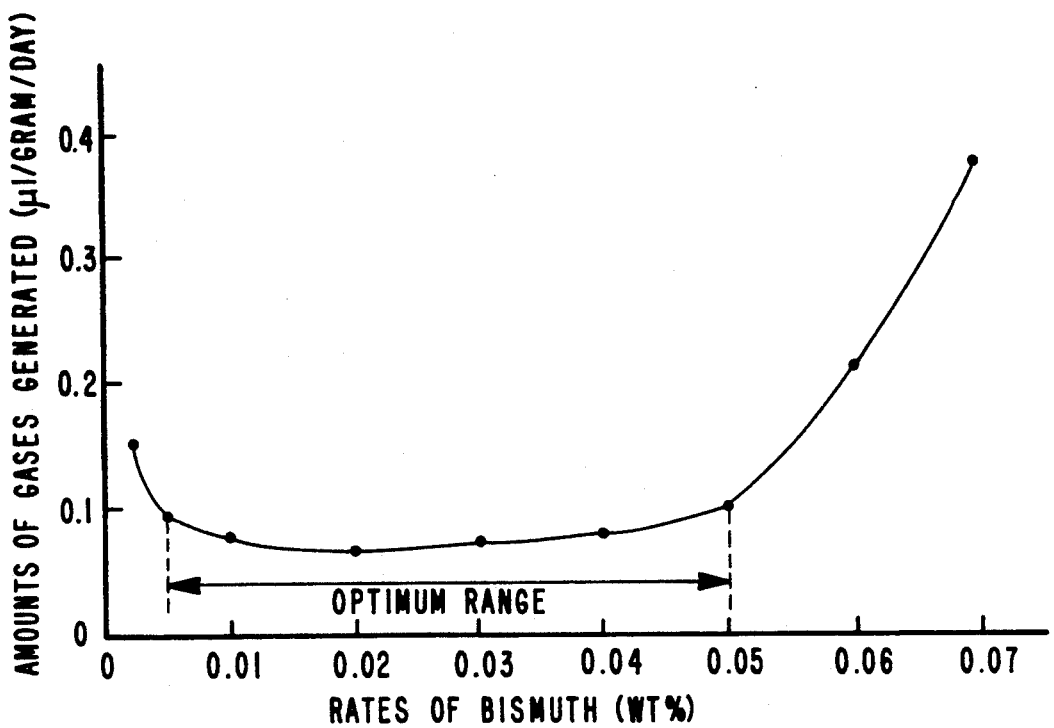
FIG. 5 is a graph showing the relationship between the rates of bismuth contained and the amounts of gases generated.

Zinc alloy powder having the bulk specific gravity of 3.2 (grams per cm$^3$) was prepared by using varying amounts of bismuth in the same manner as described hereinabove so as to contain 0.1% by weight of indium and 0.05% by weight of lead. The resulting zinc alloy powder was tested for the ability of generating gases in the same manner as described hereinabove. The test results are shown in FIG. 5.

A LR6 type cell was formed in the same manner as described hereinabove by using the zinc alloy powder prepared hereinabove so as to contain bismuth within the preferred range and found that it has achieved substantially the same discharge performance as conventional ones.

EXAMPLE 10

Figure 6:
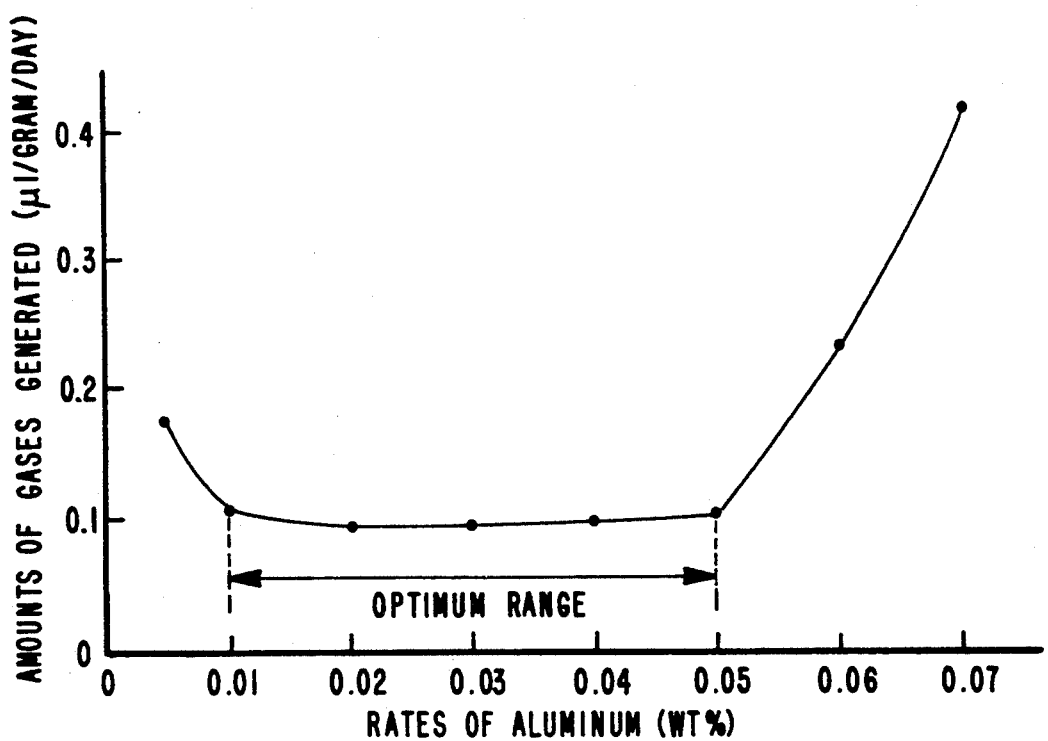
FIG. 6 is a graph showing the relationship between the rates of aluminum contained and the amounts of gases generated.

Zinc alloy powder having the bulk specific gravity of 3.2 (grams per cm$^3$) was prepared by using varying amounts of aluminum in the same manner as described hereinabove so as to contain 0.1% by weight of indium and 0.05% by weight of lead. The resulting zinc alloy powder was tested for the ability of generating gases in the same manner as described hereinabove. The test results are shown in FIG. 6.

A LR6 type cell was formed in the same manner as described hereinabove by using the zinc alloy powder prepared hereinabove so as to contain aluminum within the preferred range and found that it has achieved substantially the same discharge performance as conventional ones.

As is apparent from the test results as shown in FIGS. 3 to 6, it is preferred that the zinc alkaline cells according to the present invention can achieve performance as a cell to an extent comparative with the cells formed by using the amalgamated zinc alloy powder which has been practically employed, when the zinc alloy powder is employed which contains indium at the rate ranging from approximately 0.05% by weight to approximately 0.80% by weight, lead at the rate ranging from approximately 0.01% by weight to 0.10% by weight, bismuth at the rate ranging from approximately 0.005% by weight to 0.05% by weight, and aluminum at the rate ranging from approximately 0.01% by weight to 0.05% by weight.

As described hereinabove, the zinc alkaline cells according to the present invention can achieve corrosive resistance and discharge performance as a cell, although they do not contain mercury at all, and their performance is comparable with commercially available cells. Hence, the zinc alkaline cells according to the present invention is extremely suitable for solution to environmental problems and recycling resources.

What is claimed is:

1. A zinc alkaline cell comprising an anode active material which comprises a non-amalgamated zinc alloy powder having a bulk specific gravity ranging from approximately 2.90 to 3.50 (grams per cm$^3$) and containing indium coated on a surface of the non-amalgamated zinc alloy powder.

2. A zinc alkaline cell as claimed in claim 1, wherein zinc alloy powder prior to coating with the indium contains lead or a mixture of lead with bismuth or aluminum.

3. A zinc alkaline cell as claimed in claim 1, wherein the indium is contained at a rate ranging from approximately 0.05% by weight to 0.80% by weight and the lead is contained at a rate ranging from approximately 0.01% by weight to 0.10% by weight, with respect to the total weight of the non-amalgamated zinc alloy powder with the indium coated thereon.

4. A zinc alkaline cell as claimed in claim 1 wherein the bismuth is contained at a rate ranging from approximately 0.005% by weight to 0.05% by weight with respect to the total weight of the non-amalgamated zinc alloy powder with the indium coated thereon.

5. A zinc alkaline cell as claimed in claim 1 wherein the aluminum is contained at a rate ranging from approximately 0.01% by weight to 0.05% by weight with respect to the total weight of the non-amalgamated zinc alloy powder with the indium coated thereon.

* * * * *